United States Patent
Gila et al.

(10) Patent No.: US 7,775,098 B2
(45) Date of Patent: Aug. 17, 2010

(54) METHOD FOR ASSIGNING A TIRE PRESSURE MONITORING SYSTEM AFTER DRIVING INTERRUPTIONS AND DEVICE AND SYSTEM FOR MEASURING AIR PRESSURE IN A VEHICLE TIRE

(75) Inventors: Janos Gila, Mödling (AT); Alfred Pohl, Mistelbach (AT); Robert Tschofen, Vienna (AT)

(73) Assignee: Continental Automotive GmbH, Hannover (DE)

( * ) Notice: Subject to any disclaimer, the term of this patent is extended or adjusted under 35 U.S.C. 154(b) by 54 days.

(21) Appl. No.: 12/240,290

(22) Filed: Sep. 29, 2008

(65) Prior Publication Data

US 2009/0084174 A1    Apr. 2, 2009

(30) Foreign Application Priority Data

Sep. 28, 2007    (DE)    ........................ 10 2007 046 486

(51) Int. Cl.
    *B60C 23/02* (2006.01)
(52) U.S. Cl. ..................................................... 73/146.5
(58) Field of Classification Search .................. None
    See application file for complete search history.

(56) References Cited

U.S. PATENT DOCUMENTS

| 6,998,974 B2* | 2/2006 | Bergerhoff et al. .......... 340/444 |
| 7,271,711 B2* | 9/2007 | Daiss et al. .................. 340/447 |
| 7,397,352 B2* | 7/2008 | Fischer et al. ............... 340/447 |
| 7,414,521 B2* | 8/2008 | Jost ............................. 340/442 |
| 7,518,497 B2* | 4/2009 | Jost ............................. 340/445 |
| 2005/0145025 A1* | 7/2005 | Fischer et al. ................ 73/146 |
| 2007/0247294 A1 | 10/2007 | Baader et al. |

FOREIGN PATENT DOCUMENTS

| AT | 2003252576 A1 | 7/2004 |
| DE | 102 43 914 A1 | 5/2003 |
| DE | 102 14 472 A1 | 10/2003 |
| DE | 102 59 433 A1 | 7/2004 |
| DE | 103 58 105 A1 | 7/2005 |

OTHER PUBLICATIONS

German Patent and Trademark Office: Office Action dated Sep. 8, 2008.

* cited by examiner

*Primary Examiner*—Andre J Allen
(74) *Attorney, Agent, or Firm*—Laurence A. Greenberg; Werner H. Stemer; Ralph E. Locher

(57) ABSTRACT

A method for assigning a position of a tire, having a tire sensor, on a vehicle, includes transmitting, with the sensor, a signal including at least an identification number of the sensor following activation by a signal from an LF antenna connected to an evaluation unit. At a system start time, the evaluation unit first initiates an initialization including determination of the position of each tire having a sensor. The evaluation unit stores the identification number of each sensor together with the determined position of the tire having the sensor, before switching into a normal operating mode in which tire data, for example air pressure, is monitored by the sensors, with the position and preferably assignment of the sensor to a specific LF antenna, being stored in the sensor and kept available for retrieval. A device and a system for measuring air pressure in a vehicle tire are also provided.

14 Claims, 2 Drawing Sheets

METHOD FOR ASSIGNING A TIRE PRESSURE MONITORING SYSTEM AFTER DRIVING INTERRUPTIONS AND DEVICE AND SYSTEM FOR MEASURING AIR PRESSURE IN A VEHICLE TIRE

CROSS-REFERENCE TO RELATED APPLICATION

This application claims the priority, under 35 U.S.C. §119, of German Patent Application 10 2007 046 486.1, filed Sep. 28, 2007; the prior application is herewith incorporated by reference in its entirety.

BACKGROUND OF THE INVENTION

Field of the Invention

The invention relates to a method for assigning the position of a tire provided with a tire sensor WU having an individual identification number, on a vehicle, wherein the tire sensor WU, following activation by a receive signal transmitted by an LF antenna on the vehicle, transmits a transmit signal including at least its identification number, the LF antenna is located at a predetermined position on the vehicle and is connected to an evaluation unit ECU, at the start time of the system the evaluation unit ECU first initiates an initialization during which the position on the vehicle of each tire provided with a tire sensor WU is determined, and the evaluation unit stores the identification number of each tire sensor WU together with the position on the vehicle of the tire provided with the tire sensor WU as determined by the system, before it switches over into a normal operating mode in which tire data to be monitored, for example air pressure, is monitored by the tire sensors WU. The invention also relates to a device and a system for measuring air pressure in a vehicle tire.

Particularly in the case of trucks, position algorithms, through the use of which the position of the individual air pressure sensors or tire sensors (Wheel Unit—WU) is determined, are very complex and therefore require a lot of time. The reason therefore lies above all in the fact that in the case of the truck there are typically more than four tires to be localized, namely six tires no less, for instance, when dual tires are used on one axle, and 10 tires no less when two rear axles each fitted with dual tires are used. Since the two tires of a dual tire are mounted close together, determining the position is very complicated and time-consuming.

Tire pressure monitoring systems are known in the prior art which can perform the assignment of the positions of the respective air pressure sensors in an automated manner, i.e. without separate intervention on the part of a user, although that is a time-consuming process. If a vehicle remains stationary for a relatively long time (parking), the assignment begins over again because there is basically the possibility that a tire was changed while the vehicle was at a standstill. The system must therefore be reinitialized to ensure that the correct tires are detected by the tire pressure monitoring system so that in the event of a fault, a drop in air pressure will be signaled in the correct tire.

That totally new assignment of the tire positions after each relatively long stop of the vehicle has first and foremost the disadvantage that the tire pressure monitoring system is occupied for a considerable length of time with the reinitialization, i.e. with the correct assignment of the positions of the tire sensors WD to the individual positions on the truck, before the system can evaluate and assign the measured air pressures in the normal operating mode and is thus in a position to warn the driver effectively if there is a drop in air pressure in a specific tire.

Oftentimes the driver will have already irreversibly left his or her parking spot before a corresponding warning is signaled, with the result that the vehicle will either have to be stopped at an inconvenient point or driven further with incorrect air pressure for quite some time before the problem can be rectified. That is therefore also a real safety risk.

SUMMARY OF THE INVENTION

It is accordingly an object of the invention to provide a method for assigning a tire pressure monitoring system after driving interruptions and a device and a system for measuring air pressure in a vehicle tire, which overcome or avoid the hereinafore-mentioned disadvantages of the heretofore-known methods and devices of this general type and in which the assignment of the positions is completed more expeditiously.

With the foregoing and other objects in view there is provided, in accordance with the invention, a method for assigning a position of a tire on a vehicle. The method comprises providing an evaluation unit, transmitting a receive signal with an LF antenna located at a predetermined position on the vehicle and connected to the evaluation unit, providing the tire on the vehicle with a tire sensor having an individual identification number, and transmitting a transmit signal, including at least the identification number, with the tire sensor following activation by the receive signal, first initiating with the evaluation unit, at a system start time, an initialization including determination of the position on the vehicle of each tire provided with a tire sensor, storing the identification number of each tire sensor together with the position on the vehicle of the tire provided with the tire sensor as determined by the system, with the evaluation unit, before it switches over into a normal operating mode in which the tire sensors monitor tire data to be monitored, for example air pressure, and storing the position of the tire sensor on the vehicle, and preferably also its assignment to a specific LF antenna, in the tire sensor itself and keeping it available for retrieval.

In accordance with another mode of the invention, the tire sensor WU can, on request, transmit a signal which contains at least its identification number and its stored position in the vehicle.

In accordance with a further mode of the invention, it is particularly advantageous if, during the initialization at the time the vehicle is started, the positions stored in the tire sensors WU are first transmitted together with the associated identification numbers to the evaluation unit ECU, if the evaluation unit ECU compares the already stored values with the values transmitted by the respective tire sensor WU, and if, provided the values tally or agree, the initialization is terminated directly and a switch is made into the normal operating mode.

In accordance with an added mode of the invention, at the same time an initialization can also be performed in groups so that, for instance, the initialization is carried out separately for individual tire sensors WU or groups of tire sensors WU, with a full initialization with new position determination being performed only for those tire sensors WU or groups of tire sensors WU for which no agreement with the already stored values was established, and with the initialization with new position determination being terminated prematurely for those tire sensors WU or groups of tire sensors WU for which an agreement with the already stored values was established.

Thus, the initialization is completed considerably faster even if only one tire or only tires in one tire group have been changed. It has proven advantageous in this case if the tire sensors WU for two tires fitted immediately adjacent each other on one side of the same axle, in other words, say, the two tires of a dual tire, form a group of tire sensors WU. However, it is also possible for, say, all tire sensors WU for the tires fitted on one axle to form a group of tire sensors WU.

In accordance with an additional mode of the invention, the initialization is completed particularly quickly if the queries in the course of the initialization are effected across all LF antennas simultaneously.

In accordance with yet another mode of the invention, it is also favorable if the tire sensor WU itself carries out the comparison between stored and queried position and reports an agreement or discrepancy to the evaluation unit ECU, in which case it is particularly favorable if only negative responses, i.e. discrepancy messages, of the tire sensors WU are forwarded to the evaluation unit ECU, thereby saving on the processing of the—generally more frequently occurring—positive responses. In this case it is particularly advantageous if the number of tires actually present is stored in the evaluation unit, since otherwise after the transition to normal operation it would not be possible to establish whether or not a tire is completely missing.

With the objects of the invention in view, there is furthermore provided a device for measuring air pressure in a vehicle tire. The device comprises a pressure measuring unit, a memory for storing an identification number uniquely identifying the device, an antenna, an evaluation unit, a receiving unit connected to the antenna for receiving signals, for initiating predetermined actions in the device after receiving certain signals, and for additionally storing received signals stored in the evaluation unit, in particular signals containing a position of the device on the vehicle, beyond a time required for processing the signals, and a transmitting unit transmitting a signal containing at least the identification number in predetermined time units or following activation by a signal received from the receiving unit.

With the objects of the invention in view, there is concomitantly provided a system for measuring air pressure in vehicle tires. The system comprises a device according to the invention having at least one LF antenna, an IDA antenna, and an evaluation unit, for performing the method according to the invention.

Other features which are considered as characteristic for the invention are set forth in the appended claims.

Although the invention is illustrated and described herein as embodied in a method for assigning a tire pressure monitoring system after driving interruptions and a device and a system for measuring air pressure in a vehicle tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
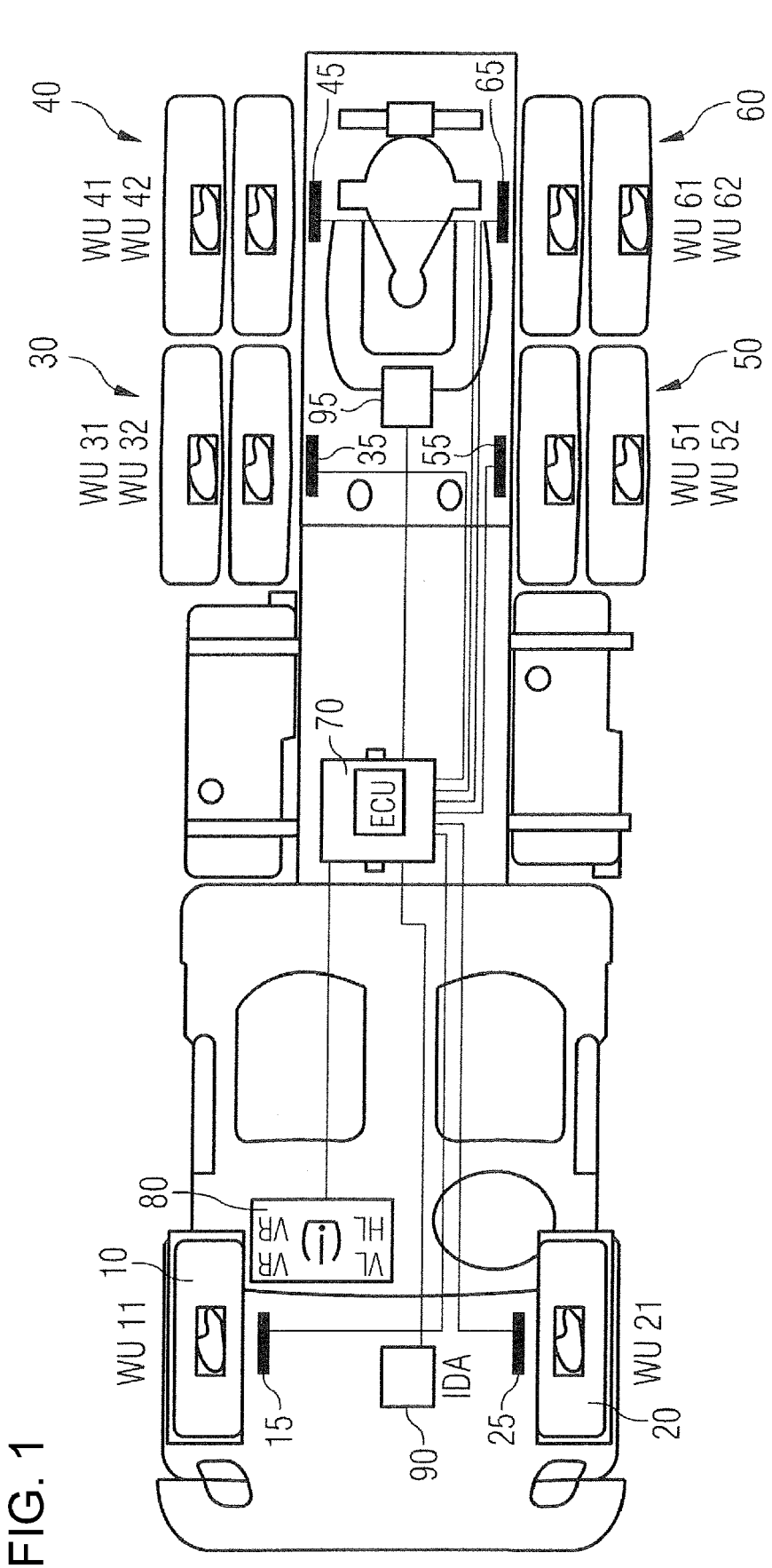
FIG. 1 is a diagrammatic, plan view of a truck having a tire pressure monitoring system.

Referring now to the figures of the drawings in detail and first, particularly, to FIG. 1 thereof, there is seen a diagrammatic illustration of a truck having ten tires, on each of which an air pressure monitoring sensor, hereinafter referred to as a tire sensor WU, is mounted. Basically, six different main positions are differentiated in this case, at which different tire sensors WU are installed, that is to say a main position 10, which is the front right (WU 11), a main position 20, which is the front left (WU 21), a main position 30, which is the rear right front (WU 31, WU 32), a main position 40, which is the rear right rear (WU 41, WU 42), a main position 50, which is the rear left front (WU 51, WU 52) and a main position 60, which is the rear left rear (WU 61, WU 62).

An LF antenna 15, 25, 35, 45, 55, 65, which can send signals to the tire sensors WU, is mounted at each of the main positions 10, 20, 30, 40, 50 and 60.

The LF antennas 15, 25, 35, 45, 55 and 65 are connected to a central evaluation unit ECU 70 in the vehicle. The evaluation unit 70, which performs all of the necessary evaluations, is in turn connected through a normal vehicle network, typically a CAN bus, to a display unit 80 which indicates to the driver if an incorrect tire pressure is possibly present in one of the tires, and moreover does so together with the position of the tire that has the incorrect pressure.

The position stored in the respective tire sensor is formed of two index numbers, in the present example it is formed of the index numbers 11, 21, 31, 32, 41, 42, 51, 52, 61 and 62. In this case, the second index advantageously designates the number of the tire sensor per associated LF antenna, with the second index being the number of the respective LF antenna itself. In the example, WU 32 therefore denotes the second tire sensor which is assigned to the antenna "three" (35).

The first time that the system is started, for instance after a tire change or when the vehicle is started up, the overall status is unknown, i.e. the evaluation unit 70 has no information about the tire sensors WU connected to it, which is just as little information as the tire sensors WU have about stored values that indicate their position on the vehicle, defined by number of the antenna and group number associated with this antenna. A complete assignment process therefore begins which takes a certain amount of time. In this process each tire sensor is queried individually in a very involved and time-consuming procedure, but one known in the prior art, and the position as well as the identification number of the tire sensor are stored in the evaluation unit 70.

Figure 2:
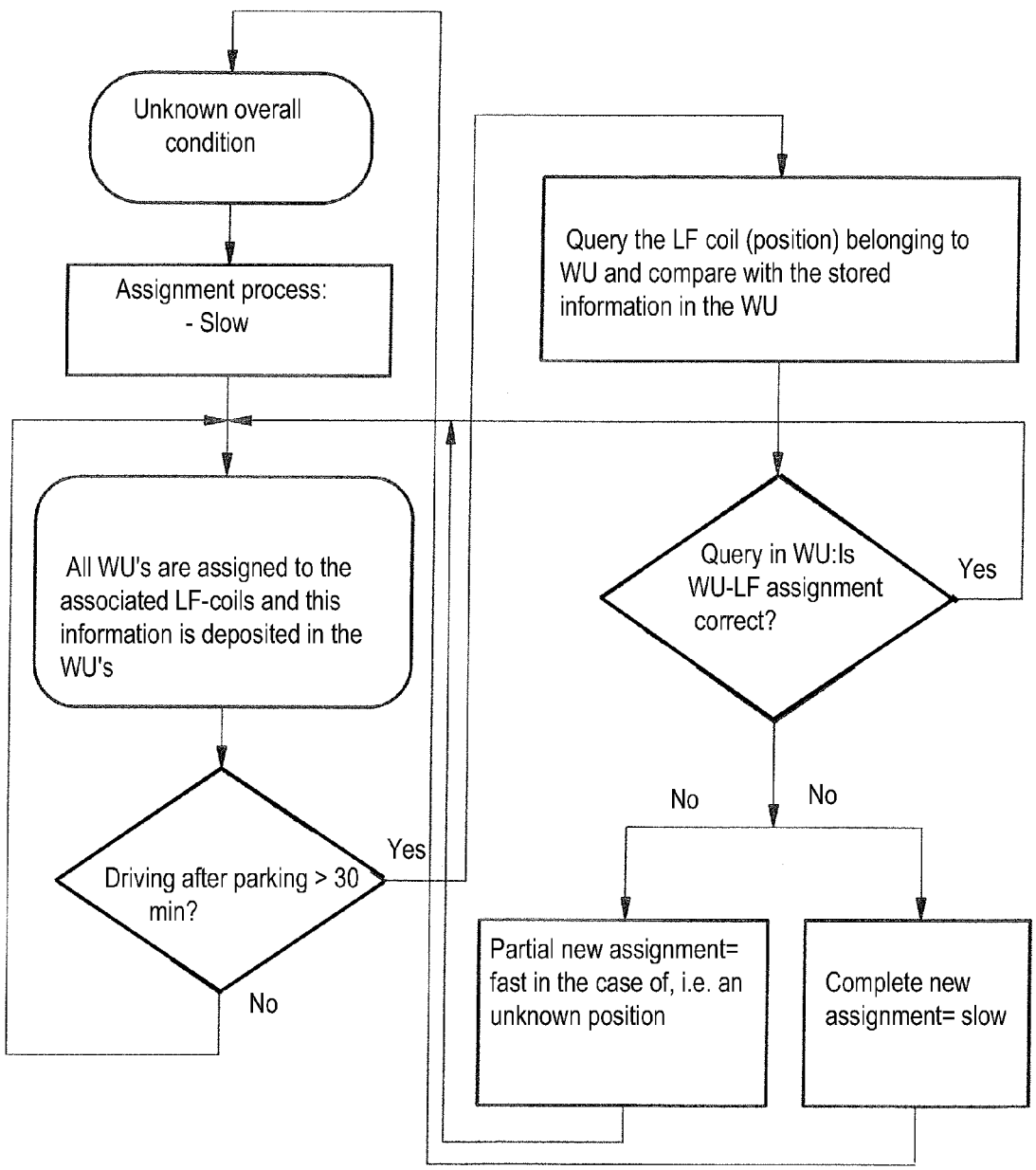
FIG. 2 is a flowchart explaining the method according to the invention in more detail.

What is novel about the present invention and is explained with reference to FIG. 2, which shows a flowchart, is that the position of the tire pressure sensor WU, formed of an index which indicates the association with the respective antenna and a group position for the respective antenna, is also stored in the tire pressure sensor itself, which for that purpose has a rewritable memory.

Once the initialization has been completed, all of the tire sensors are correctly registered on the system, which can thus switch over to a normal operating mode. In the normal operating mode, the air pressures in the tires for instance are measured, as is known in the prior art, at certain time intervals that are defined in the individual case and sent through the tire sensors to IDA antennas 90, 95 which forward the information to the evaluation unit 70.

If a fault occurs, i.e. if at least one tire has an air pressure above or below a preset threshold, a warning signal is sent together with the position identification of the tire to the display unit 80 which warns the driver of the vehicle that an air pressure is not correct in a more precisely identified tire.

If the vehicle is parked, i.e. switched off, for a relatively long time, for example 30 minutes, it is basically possible that a tire has been changed during this time, in other words that the assignment will no longer be correct when the system is next started.

According to the invention, therefore, a comparison is first carried out at the restart of the system to determine whether the individual tire sensors are still mounted at the previous point on the vehicle, which position is also stored in the respective tire sensor itself, or whether this is not the case.

This can take place, for instance, in such a way that the evaluation unit 70 addresses the individual tire sensors 11 to 62 through the antennas 15 to 65 by sending the position stored for each tire sensor in the evaluation unit to the respective tire sensor. In this procedure, the associated antenna is used in all cases, i.e. a tire in the main group 50 will only be addressed through the antenna 55.

The evaluation unit therefore sends, for example, a trigger signal to the antenna 55, which transmits the stored addresses of the tire sensors 51 and 52. The number of the associated antenna is contained in the stored addresses. Alternatively, it is also possible to transmit only the address of the antenna 55.

The tire sensors 51, 52 themselves now compare the position stored in them with the received position. If these tally, they send a corresponding bit, equivalent to the information "yes", to the IDA antenna 95, which forwards this information to the evaluation unit 70.

At positions at which more than one tire is addressed by an antenna, namely for instance at the positions 30, 40, 50 and 60, at which dual tires are fitted, the information as to which tire is disposed where in the group is lost. The comparison only determines whether the position of the tire belongs to the respective antenna or not.

In practice, this is not a restriction that needs to be taken seriously since it should occur rather rarely that an inner tire has been exchanged for an outer tire without other positions being changed in addition. Should this nonetheless be the case on occasion, the driver will still receive the correct alert from the system indicating at which main position the wrong tire pressure is present, so that if need be he or she must check two instead of only one tire after the system has indicated a fault.

As long as all of the tire sensors respond with "yes" to the initialization query, the system and therefore the evaluation unit 70 can assume that after the vehicle stop the tire positions still correspond to the stored values, with the result that the long-drawn-out process of individual detection does not have to be executed. The initialization is therefore aborted right away and the system switches to the normal mode since it assumes that no tire has been changed.

If the system should establish that an assignment is not correct, i.e. that a tire sensor responds with "no", a complete reassignment of all positions takes place.

Alternatively, it is also possible to operate the system in such a way that if there is only one response "no", only one redetermination will be carried out at this main position or at these main positions, but the remaining values will be taken over as is. This can, of course, also apply to two, three or more values, although in practice it has proved not worthwhile to redetermine only individual main groups when there are more than two "no" messages. In this case, major changes have been carried out on the vehicle, so it makes sense to perform a general redetermination.

The querying of the positions after a restart of the system can be speeded up in addition if the positions are interrogated simultaneously across all antennas. In this case, it is particularly advantageous if only a response "no" is forwarded and the response "yes" is suppressed and not forwarded at all. This generally shrinks the volume of information to be processed, thereby speeding up the process overall and substantially reducing the number of colliding information packets.

In order to increase operating reliability, it is alternatively possible in this embodiment variant to evaluate the positive responses "yes" as well after a certain number of restarts, for instance at every tenth restart, and/or alternatively fundamentally to initiate a total redetermination of the positions after a greater number of restarts.

The invention claimed is:

1. A method for assigning a position of a tire on a vehicle, the method comprising the following steps:
    providing an evaluation unit;
    transmitting a receive signal with an LF antenna located at a predetermined position on the vehicle and connected to the evaluation unit;
    providing the tire on the vehicle with a tire sensor having an individual identification number, and transmitting a transmit signal, including at least the identification number, with the tire sensor following activation by the receive signal;
    first initiating with the evaluation unit, at a system start time, an initialization including determination of the position on the vehicle of each tire provided with a tire sensor;
    storing the identification number of each tire sensor together with the position on the vehicle of the tire provided with the tire sensor as determined by the system, with the evaluation unit, before it switches over into a normal operating mode in which the tire sensors monitor tire data to be monitored; and
    storing the position of the tire sensor on the vehicle in the tire sensor itself and keeping the position of the tire sensor available for retrieval.

2. The method according to claim 1, wherein the tire data to be monitored includes air pressure.

3. The method according to claim 1, which further comprises storing the assignment of the tire sensor to a specific LF antenna in the tire sensor itself and keeping the assignment of the tire sensor available for retrieval.

4. The method according to claim 1, which further comprises transmitting on request, with the tire sensor, a signal containing at least its identification number and its stored position in the vehicle.

5. The method according to claim 1, which further comprises, during the initialization at a starting time of the vehicle, first transmitting the positions stored in the tire sensors together with the associated identification numbers to the evaluation unit, comparing, with the evaluation unit, the already stored values with values transmitted by the respective tire sensor, and if the values agree, terminating the initialization directly and switching into the normal operating mode.

6. The method according to claim 1, which further comprises carrying out the initialization separately for individual tire sensors or groups of tire sensors, with a full initialization with new position determination being performed only for those tire sensors or groups of tire sensors for which no agreement with the already stored values was established, and with the initialization with new position determination being terminated prematurely for those tire sensors or groups of tire sensors for which an agreement with the already stored values was established.

7. The method according to claim 6, wherein the tire sensors for two tires fitted immediately adjacent each other on one side of the same axle form a group of tire sensors.

8. The method according to claim 6, wherein the tire sensors for tires fitted on one axle form a group of tire sensors.

9. The method according to claim 1, which further comprises simultaneously effecting queries during the initialization across all of the LF antennas.

10. The method according to claim 1, which further comprises carrying out a comparison between stored and queried position in the tire sensors, which report an agreement or discrepancy to the evaluation unit.

11. The method according to claim 1, which further comprises only forwarding discrepancy messages of the tire sensors to the evaluation unit.

12. A device for measuring air pressure in a tire of a motor vehicle and for communicating with a central monitoring unit of a tire monitoring system of the motor vehicle, the device comprising:
   a pressure measuring unit;
   a memory for storing an identification number uniquely identifying the device;
   an antenna;
   an evaluation unit;
   a receiving unit connected to said antenna for receiving signals from the central monitoring unit of the tire monitoring system, for initiating predetermined actions in the device after receiving certain signals, and for additionally storing signals received from the central monitoring unit and containing a position of the device on the vehicle beyond a time required for processing the signals; and
   a transmitting unit transmitting a signal containing at least the identification number in predetermined time units or following activation by a signal received from said receiving unit.

13. A system for measuring air pressure in vehicle tires, the system comprising:
   a device including a pressure measuring unit, a memory for storing an identification number uniquely identifying said device, at least one LF antenna, an evaluation unit, a receiving unit connected to said at least one LF antenna for receiving signals, for initiating predetermined actions in said device after receiving certain signals, and for additionally storing received signals stored in said evaluation unit beyond a time required for processing the signals, and a transmitting unit transmitting a signal containing at least the identification number in predetermined time units or following activation by a signal received from said receiving unit;
   an IDA antenna; and
   an evaluation and processing unit programmed to perform the method according to claim 1.

14. The system according to claim 13, wherein the received signals contain a position of the device on the vehicle.

* * * * *